United States Patent
Mao et al.

(10) Patent No.: US 7,203,953 B2
(45) Date of Patent: Apr. 10, 2007

(54) METHOD AND APPARATUS FOR TWO-WAY INTERNET ACCESS OVER A CATV NETWORK WITH CHANNEL TRACKING

(75) Inventors: Weidong Mao, West Windsor, NJ (US); David Chen, Ivyland, PA (US); Ami Miron, Dresher, PA (US)

(73) Assignee: TVWorks, LLC, Philadelphia, PA (US)

( * ) Notice: Subject to any disclaimer, the term of this patent is extended or adjusted under 35 U.S.C. 154(b) by 856 days.

(21) Appl. No.: 09/731,225

(22) Filed: Dec. 6, 2000

(65) Prior Publication Data
US 2002/0108119 A1    Aug. 8, 2002

(51) Int. Cl.
*H04N 7/173* (2006.01)
(52) U.S. Cl. .................. 725/109; 725/111; 725/114; 725/116; 725/126; 725/131
(58) Field of Classification Search ............... 725/105, 725/126, 131, 114, 116, 111, 109
See application file for complete search history.

(56) References Cited

U.S. PATENT DOCUMENTS

| | | | | |
|---|---|---|---|---|
| 5,497,187 | A * | 3/1996 | Banker et al. ............... | 725/144 |
| 5,987,518 | A * | 11/1999 | Gotwald ....................... | 709/230 |
| 6,378,130 | B1 * | 4/2002 | Adams ......................... | 725/95 |
| 6,728,965 | B1 * | 4/2004 | Mao ............................. | 725/38 |
| 6,918,135 | B1 * | 7/2005 | Goffin, II .................... | 725/116 |
| 6,928,656 | B1 * | 8/2005 | Addington .................. | 725/111 |
| 2002/0046408 | A1 * | 4/2002 | Tsutsui et al. ............... | 725/125 |

FOREIGN PATENT DOCUMENTS

| | | |
|---|---|---|
| EP | 0 479 432 A | 4/1992 |
| EP | 0479432 A | 8/1992 |
| EP | 0 901 261 A | 3/1999 |
| EP | 0901261 A | 10/1999 |
| WO | WO 9728652 A | 7/1997 |
| WO | WO 97 28652 A | 8/1997 |
| WO | WO 9728652 A | 8/1997 |
| WO | WO 98 47288 A | 10/1998 |
| WO | WO 9847288 A | 10/1998 |
| WO | WO 99 18718 A | 4/1999 |
| WO | WO 9918718 A | 4/1999 |
| WO | WO 9951030 A | 7/1999 |
| WO | WO 99 51030 A | 10/1999 |

* cited by examiner

*Primary Examiner*—Chris Kelley
*Assistant Examiner*—Joseph G. Ustaris
(74) *Attorney, Agent, or Firm*—Patterson & Sheridan, LLP

(57) ABSTRACT

Internet access is provided over a digital cable television system using Internet protocol (IP) over MPEG digital video. Simultaneous Internet access and TV viewing is provided by an IP over MPEG-2 video system with channel tracking. Whenever a video channel change is detected, the viewer's Internet connection is routed from one video channel to another video channel so that the Internet connection is dynamically routed and tracks the channel changes made by the viewer. Additionally, if there is no available data carrying capacity in the video channel selected by the viewer (a "busy" condition), the Internet connection is routed to an out-of-band frequency. The Internet connection tracks the channel changes made by the viewer using a single tuner/digital MPEG decoder in the CATV settop box.

14 Claims, 8 Drawing Sheets

SIGNAL FLOW

STEP 1 UPON CHANNEL CHANGE AND IP TRAFFIC STB SENDS CHANNEL RESOURCE REQUEST USING OOB UPSTREAM

STEP 2 SERVER SENDS CHANNEL RESOURCE CONFIRM USING OOB DOWNSTREAM

STEP 3 SERVER ROUTES THE IP PACKETS TO THE RIGHT IN-BAND TRANSPORT

STEP 4 SERVER CAN ALSO ROUTES THE IP PACKET TO THE OOB DOWNSTREAM

FIG. 7
CHANNEL RESOURCE REQUEST MESSAGES

```
Channel Resource Request Message(){
  commonDescriptorHeader(){
    resourceRequestID              2              STB assigned ID for message
    resourceDescriptorType         "0x0004"       PhysicalChannelResourceDescriptor
    resourceNum                    2              NOT USED
    associationTag                 2              NOT USED
    resourceFlags                  "0x42"         Use only current channel "non-Negotiable"
                                   (or "0x46")    (Can use any channel "Negotiable")
                                   1              NOT USED
    resourceStatus                 "0x0006"       Total length of the descriptor
    resourceLength                 "0x0001"       Only one resource descriptor
    resourceDataFieldCount
  }
  PhysicalChannelResourceDescriptor(){
    channelID                      4              programID(2)+transport_streamID(2)

direction                      "0x0000"       (downstream)
  }
}
```

FIG. 8
CHANNEL RESOURCE CONFIRM MESSAGES

```
Channel Resource Confirm Message(){ commonDescriptorHeader(){
    resourceRequestID          2                    STB assigned ID for message
    resourceDescriptorType     "0x0003"             MPEGProgramResourceDescriptor
    resourceNum                2                    Assigned by server (0x8000-0x8fff)
    associationTag             2                    NOT USED
    resourceFlags              "0x42"               Use only current channel "non-Negotiable"
                               (or "0x46")          (Can use any channel "Negotiable")
    resourceStatus             1                    See status table
    resourceLength             "0x0010"             Total length of the descriptor
    resourceDataFieldCount     "0x0001"             Only one resource descriptor
}

MPEGProgramResourceDescriptor(){
    mpegProgramNum             2                    ProgramID
    mpegPmtPid                 2                    TransportStreamID
    mpegCaPID                  2                    NOT USED
    elementaryStreamCount      "0x0001"             Only one data PID per TS
    mpegPID                    2                    PID for the data "FFFF" for Out-of-Band
    stream_type                "0x0D"               DVB Multi-Protocol Encapsulation
    reserved                   "0x00"
    associationTag             2                    NOT USED
    mpegPCR                    "0xffff"             No PCR
}

}
```

METHOD AND APPARATUS FOR TWO-WAY INTERNET ACCESS OVER A CATV NETWORK WITH CHANNEL TRACKING

FIELD OF THE INVENTION

The present invention relates to a system for providing Internet access over CATV networks.

BACKGROUND OF THE INVENTION

Internet access over CATV systems is typically accomplished using a cable modem. As an industry standard, the Data Over Cable Interface Specification (DOCIS) has emerged to provide interoperability between cable modems from diverse manufacturers. Internet access by cable modem provides generally higher download data rates than dial up modem access over POTS (Plain Old Telephone Service), ISDN (Integrated Services Digital Network) or DSL (Digital Subscriber Line) services. A typical cable modem is frequency agile and utilizes the unused portions of the CATV frequency spectrum to transmit signals in the upstream and downstream directions. While cable modems are often stand alone boxes, some CATV settop boxes are provided with a built-in cable modem.

In the downstream direction, (from the headend to the subscriber) cable modems make use of unused frequencies in the available frequency spectrum above 50 MHz. Most of the spectrum above 50 MHz is used for the delivery of video programs. A typical CATV system may have spectrum usable for data above the upper limit usable for video (say above 500 MHz for many systems or above 750–1000 MHz for newer systems). Also, a CATV system has an unused mid-band frequency region between 70 MHz and 130 MHz that does not contain video channels. The downstream data capacity of a CATV system is thus confined to the 70–130 MHz band and the band above the highest video channel. While an analog video signal may carry some digital data (such as data in the vertical blanking interval), the data carrying capacity of a standard analog format TV signal is severely limited. Although any video channel could be pre-empted and used to transmit downstream data, CATV operators are reluctant to convert a video channel to an all data channel because it reduces the video capacity of the CATV system.

The return path (the upstream direction from the subscriber to the headend) of a CATV system is the frequency band below 50 MHz. Typically, only a portion of the upstream return spectrum, from 5 to 30 MHz, is used, leaving a guard band of 20 MHz between the highest upstream frequency (30 MHz) and lowest downstream frequency (50 MHz). Unusable frequencies below 5 MHz are excluded. The non-video frequencies (in this case, 5–30 MHz, 70–130 Mhz and those above the highest video signal) are referred to herein as the out-of-band (OOB) frequencies. The video channels are organized as 6 MHz frequency bands, each carrying one NTSC analog video signal.

A cable modem may thus operate on any available pair of frequencies, one downstream out-of-band frequency and one upstream out-of-band frequency. The subscriber (viewer) may use the resulting two-way communication over the CATV system solely for Internet access via cable modem. However, TV video content and Internet content may be linked or related to each other. For example, a video sports event may access the Internet for sports statistics related to the video sports event. A TV advertisement may reference a related Web site, or accept direct orders for merchandise over the Internet. However, if the subscriber desires to access the Internet via a cable modem and also receive cable TV video at the same time, then two tuners are required: one for tuning a video signal an another for tuning the cable modem signal.

CATV systems typically transmit digital video in MPEG-2 format, which makes better use of the available CATV spectrum as compared to analog signals. A 6 MHz video channel, which normally carries one standard definition analog channel, may carry at least 4 multiplexed digital video programs or at least 1 high definition digital video program. In addition to expanded video capacity, digital multiplexed MPEG-2 video standards include capacity for carrying Internet Protocol data (IP over MPEG). The private data portions of multiplexed MPEG-2 video may carry Internet Protocol (IP) over the same channel with simultaneous multiplexed MPEG-2 digital TV signals. In such manner, the in-band frequencies (the video channels) carry downstream Internet data along with cable TV digital video.

However, the viewer may be receiving IP over MPEG on one 6 MHz video channel and desire to watch a digital TV program that is multiplexed on another 6 MHz video channel. Therefore, two tuners and two digital MPEG decoders are needed if the subscriber is to be able to simultaneously receive both IP over MPEG Internet data on any digital video channel and view a digital video program from another MPEG encoded 6 MHz video channel. It would be desirable to utilize the downstream data carrying capacity of the in-band CATV spectrum to simultaneously receive both IP over MPEG Internet data and MPEG encoded digital video using a single tuner/digital MPEG decoder in the CATV settop box.

SUMMARY OF THE INVENTION

The present invention is embodied in an Internet Protocol over MPEG-2 video system with channel tracking to route the viewer's Internet connection from one digital TV channel to another. The viewer's the Internet connection is dynamically routed so as to track the channel changes made by the viewer.

In addition, if there is no available data carrying capacity in the 6 MHz video channel selected by the viewer (a "busy" condition), the downstream in-band Internet connection is routed to a downstream out-of-band frequency. Upon subsequent channel changes by the viewer to a 6 MHz video channel that is not "busy," the viewer's Internet connection is re-routed to an in-band IP over MPEG data packet in the same 6 MHz as the viewer's selected digital video channel. In such manner, the Internet connection tracks the channel changes made by the viewer permitting the use of a single tuner/digital decoder in the CATV settop box.

BRIEF DESCRIPTION OF THE DRAWINGS

FIG. 7 illustrates the format of a Channel Change Request message.

FIG. 8 illustrates the format of a Channel Resource Confirmation message.

DETAILED DESCRIPTION

Figure 1:
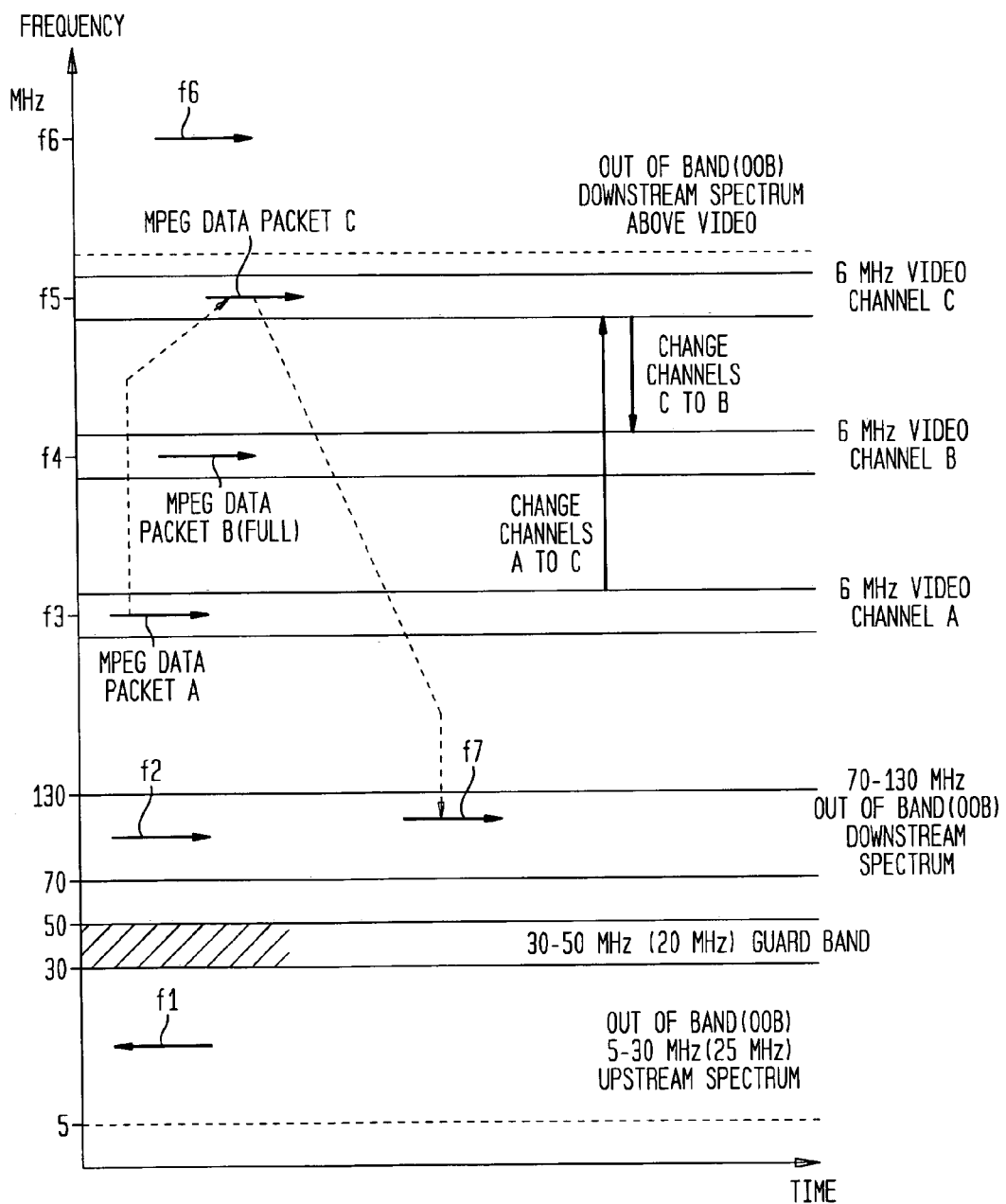
FIG. 1 is a diagram illustrating the spectrum allocation in a CATV system in accordance with the present invention.

The frequency allocation for a typical CATV system is illustrated in FIG. 1. The upstream out-of-band spectrum ranges from 5 MHz to 30 MHz. There is a guard band from 30 MHz to 50 MHz. Regular 6 MHz video channels begin above 50 MHz. From 70 MHz to 130 MHz there is a mid-band region that does not normally contain video program information and is used for out-of-band downstream data. Regular 6 MHz spaced video channels begin again above 130 MHz and continue up to the highest frequency limit of the CATV system.

For example, frequency f1 is an upstream out-of-band carrier signal in the return spectrum. Frequency f2, f7 (mid-band) and f6 (out-of-band above video) are downstream out-of-band carrier signals. Frequency f3, f4 and f5 represent the center carriers of three 6 MHz video channels, corresponding to digital video channel A, digital video channel B and digital video channel C, respectivly. Each of the digital video channels A, B, and C, contain respective IP packets over MPEG digital video. In particular, video channel A contains MPEG data packet A, video channel B contains MPEG data packet B while video channel C contains MPEG data packet C.

Channel Tracking

The operation of the present invention to implement channel tracking is illustrated by the frequency transitions (dashed line arrows) in FIG. 1.

In particular, assume that a viewer is watching video channel A and receiving Internet access via MPEG data packet A. The tuner/MPEG decoder is receiving data and digital video on frequency f3. When the viewer changes video channels from video channel A to video channel C, the tuner/MPEG decoder in the settop box tunes to frequency f5, the carrier frequency of video channel C. At this point, the settop box (having a single tuner/MPEG decoder) can no longer receive MPEG data on frequency f3. In accordance with the channel tracking features of the present invention, the Internet access connection for the viewer will be transferred to MPEG data packet C on video channel C. In such manner, the Internet connection is not lost upon changing channels.

When the viewer subsequently changes channels from video channel C to video channel B, the tuner/MPEG decoder in the settop box tunes to frequency f4, the center frequency of video channel B. At this point, the settop box can no longer receive frequency f4.

Busy Conditions

However, assume that other subscribers are utilizing all of the IP data carrying capacity of video channel B on frequency f4. Since all of capacity for carrying IP data packets is occupied, MPEG data packet B is considered full. A condition in which there is no available IP data carrying capacity in a given 6 MHz video channel is called a "busy" condition. In response to a busy condition, the viewer's Internet connection is routed to an out-of-band frequency f7. The transitions representing re-routing of the viewer's Internet access connection is shown by dashed arrows between carrier frequencies f3 and f4 (tracking a channel change from channel A to channel C), and carrier frequencies f4 and f7 (tracking a channel change from channel C to channel B.

Figure 2:
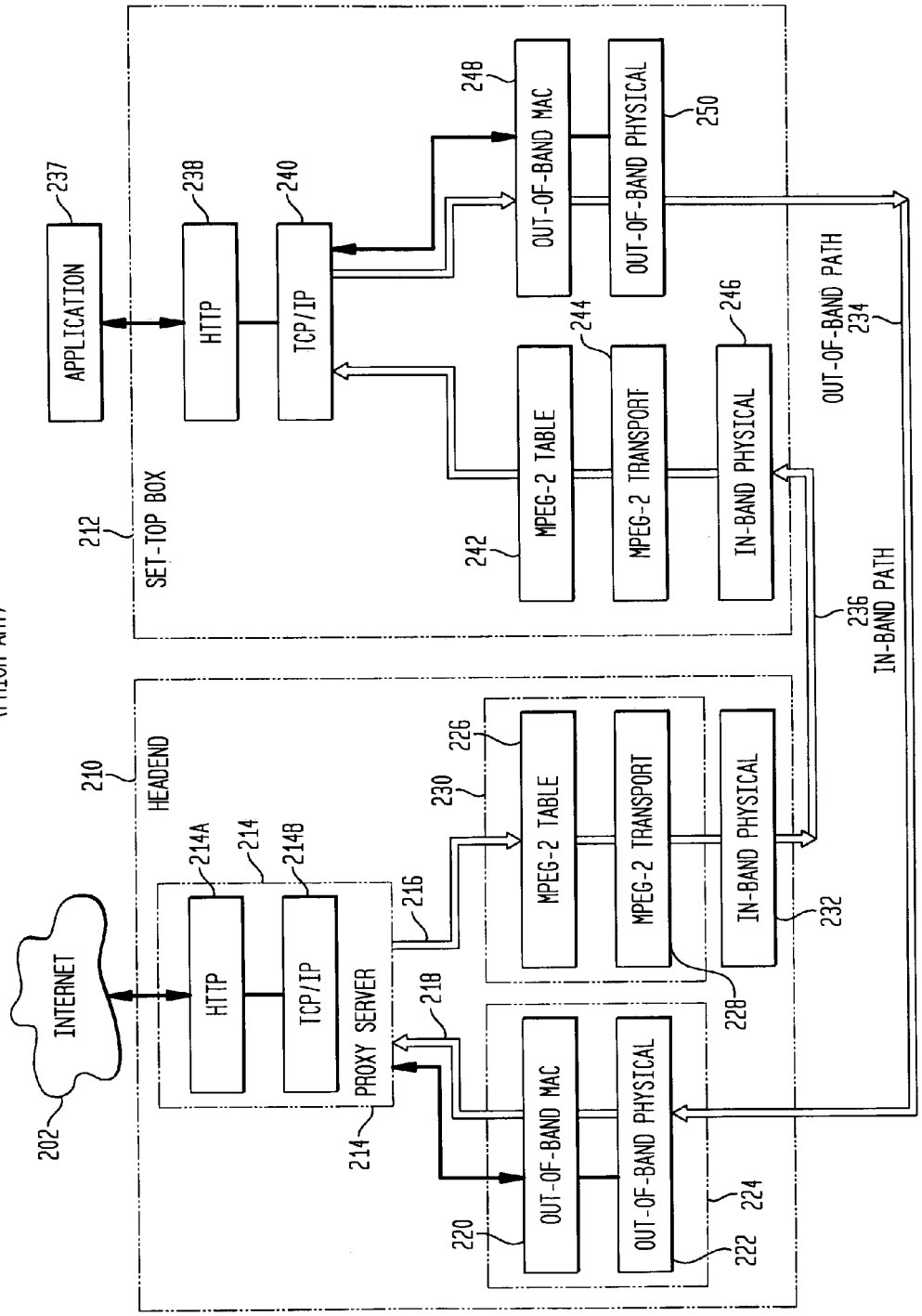
FIG. 2 is a block diagram of a prior art IP over MPEG system.

A block diagram of a standard IP over MPEG Internet access system is shown in FIG. 2. The downstream channel is standard IP over MPEG, while the return channel is via a standard out-of-band cable modem upstream channel.

At the headend 210, a proxy server 214 comprises an HTTP interface 214A to the Internet 202 and a TCP/IP stack 214B. The downstream IP packets 216 are formatted in MPEG encoder 230 where the MPEG table 226, and the MPEG transport module 228 format the MPEG data stream to an in-band transmitter 232 on the physical in-band data path 236.

At the settop box 212, an in-band receiver 246, an MPEG transport module 244 and an MPEG table 242 recover the IP data packet for TCP/IP stack 240 and HTTP interface 238. The specific application is displayed on the TV 237. IP packets for the return channel are routed through an out-of-band media access controller 248 and an out-of-band transmitter 250. The out-of-band return path 234 is received at the headend 210 by an out-of-band receiver 222 and an out-of-band media access controller 220. The return packets 218 are forwarded to the TCP/IP protocol stack 214B and HTTP interface 214A for transmission on the Internet 202.

The system shown in FIG. 2 does not include a provision for channel tracking. If the viewer changes the tuner frequency of the in-band receiver 246 in order to view a different multiplexed digital video program on a different 6 MHz video channel, the Internet connection (via IP over MPEG data packet) on the present channel will be lost.

Figure 3:
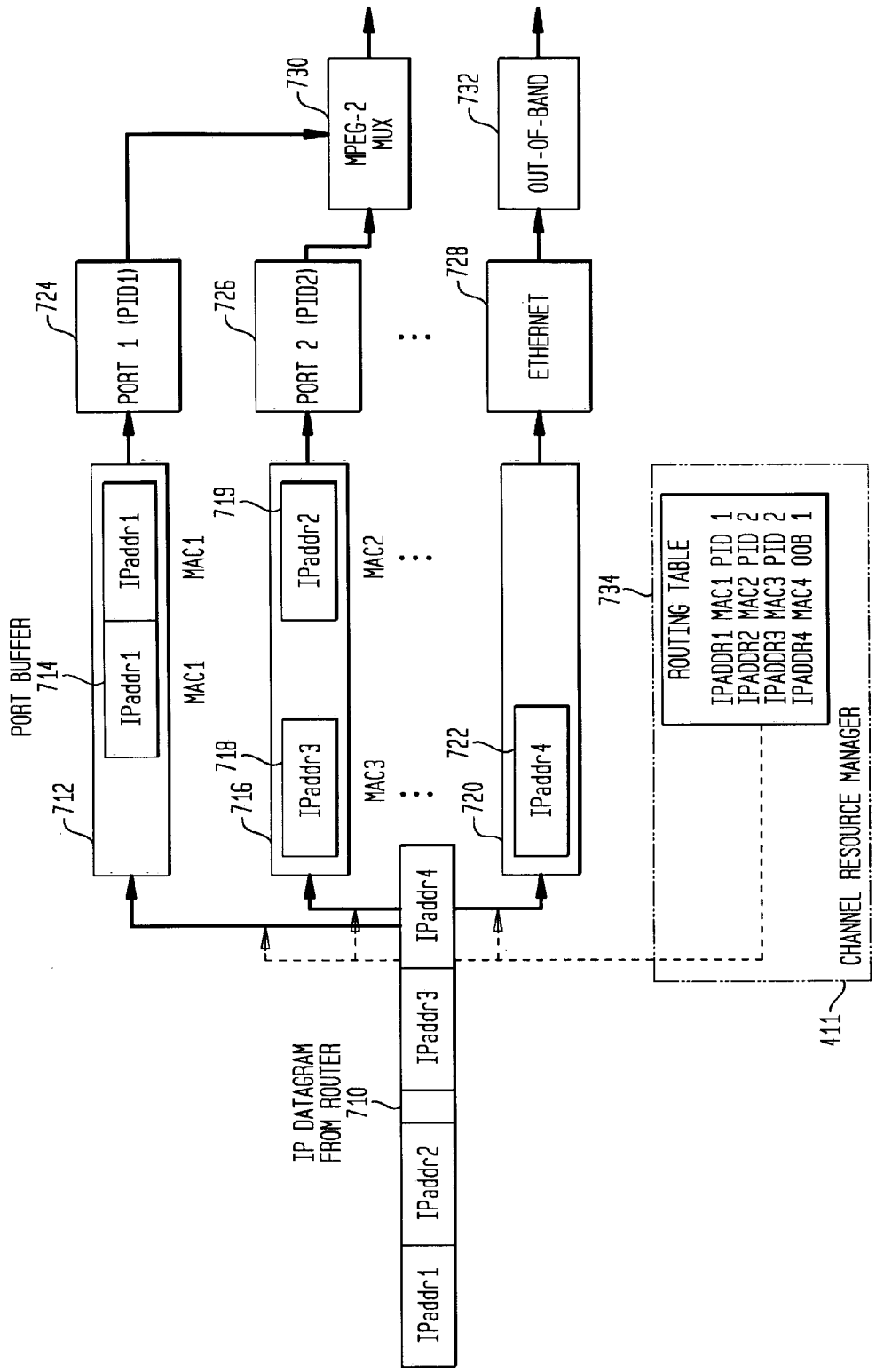
FIG. 3 is a block diagram of a CATV system with a master headend 301 and multiple remote headends using an IP over MPEG system with channel tracking in accordance with the present invention.

A CATV system with multiple remote headends in accordance with the present invention that uses IP over MPEG for Internet access with channel tracking is shown in FIG. 3. At the master headend 301, a proxy server 304 is coupled via a local area network 306 to the Internet 302 and a master router 308. Under the control of an application manager CPU 312, the access control CPU 314 (both of which are coupled to the master router 308 via a local area network bus 310) formats IP over MPEG digital video 316. The master headend 301 is coupled to a plurality of remote headends 320, 326 via a SDH/ATM network 318.

Each of remote headends 320, 326 includes a local router 322, 328, and one or more hybrid fiber coax (HFC) network interfaces 324, 330, 332 coupled to respective hybrid fiber coax distribution systems 334, 336, 338. A plurality of settop boxes 344, 350, 356 at each subscriber location 340, 346, 352 (which may include respective PC's 342, 348, 354) is coupled to each HFC distribution system 334, 336, 338. The digital video multiplexer 316 at the master headend 301 provides common transport 360 to each HFC distribution system 334, 336, 338 and local transport 362 to an individual HFC system 338.

Figure 4:
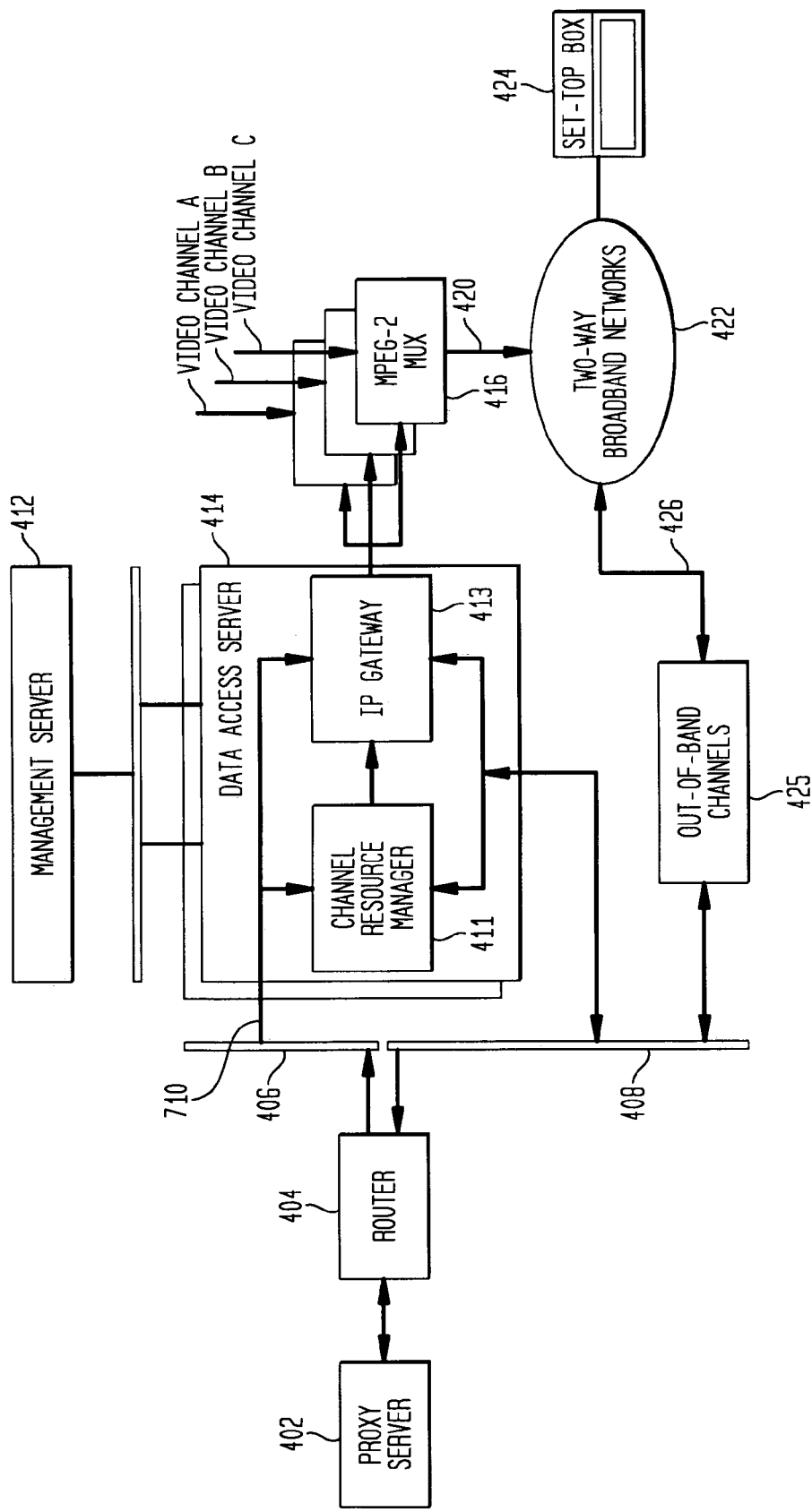
FIG. 4 is a block diagram of a CATV system using an IP over MPEG system with channel tracking in accordance with the present invention.

A block diagram of a CATV system using IP over MPEG with channel tracking is shown in further detail in FIG. 4. A proxy server 402 and router 404 provide access to the Internet and are coupled via a local area network 406, 408 to an access control CPU 414. An application manager CPU 412 is also coupled via a local area network bus to the access control CPU 414, which in turn controls MPEG-2 multiplexers 416. The access control 414 is further composed of a channel resource manager 411 and an IP gateway 413. Each 6 MHz video channel, (e.g. video channel A, video channel B, and video channel C) is multiplexed 420 onto the two-way broadband network 422 for transmission to each individual settop box 424. Return signals from each settop box 424 reach the headend via an out-of-band channel transceiver 425.

Figure 5:
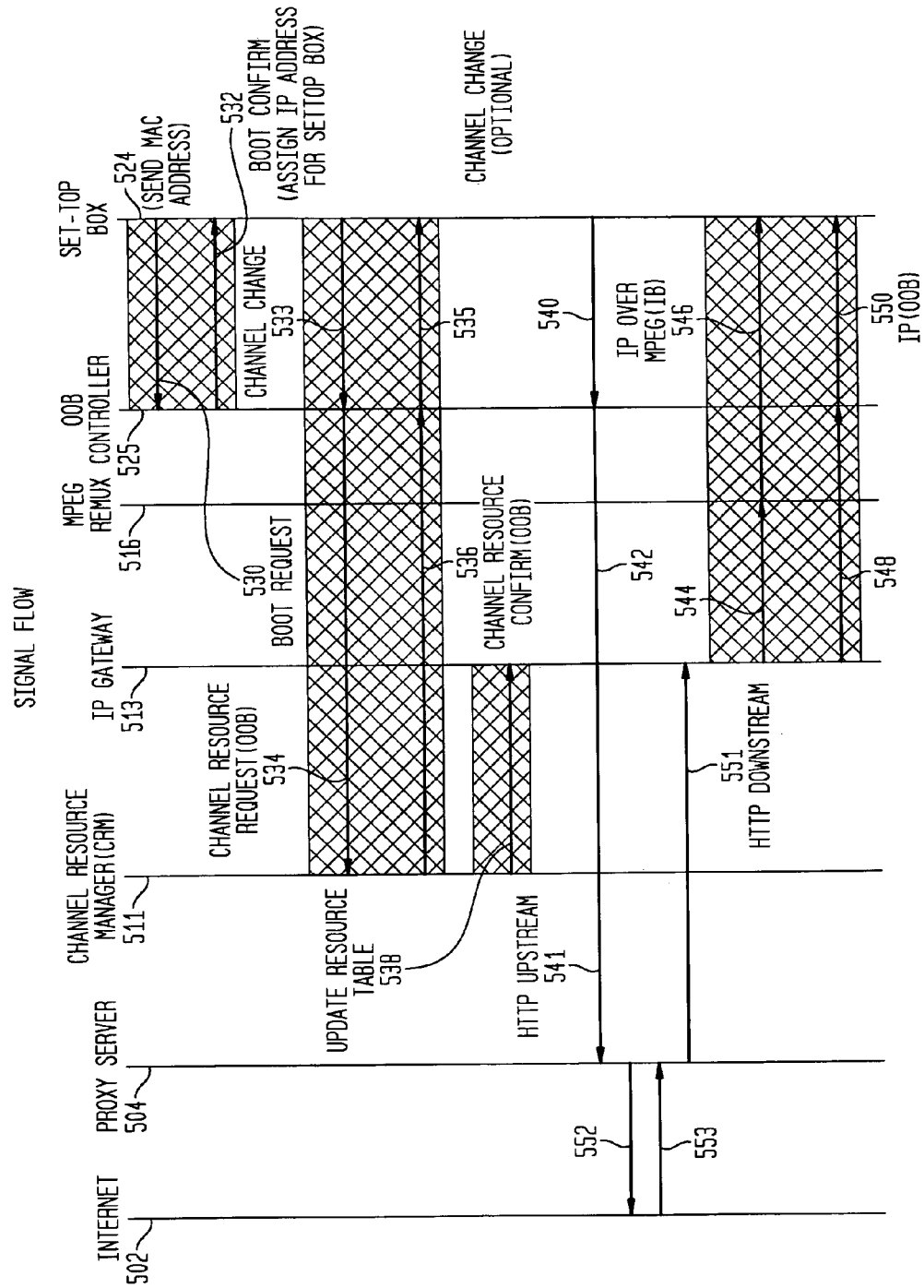
FIG. 5 is a signal flow diagram illustrating the message protocol to implement channel tracking in accordance with present invention.

The signal flow between system elements of FIGS. 3 and 4 is illustrated in FIG. 5. The system elements sending and receiving messages are the Internet 502, a proxy server 504, a channel resource manager 511, IP gateway 513, MPEG multiplexer 516, an out-of-band controller 525 and the settop box 524.

Initialization

Initially, the settop box 524 forwards a Bootp request 530 to the out-of-band controller 525, which responds with a Bootp confirm. After boot-up, a communication session is established in which downstream IP data is transmitted as IP over MPEG IB (in-band) and upstream IP data is transmitted as IP OOB (out-of-band).

Channel Changes

In response to a channel change by the viewer, the settop 524 sends a channel change request 533 to the out-of-band controller 525 at the headend, which forwards 534 the out-of-band channel change request to the channel resource manager 511. FIG. 7 illustrates the format of the Channel Change Request message. The channel resource manager 511 determines whether the requested channel (6 MHz multiplexed MPEG digital video channel) can support another IP user. If so, the channel resource manager assigns a packet ID (PID) to the new user (settop 524). If no PID is available on the requested channel, the channel resource manager assigns a default PID of "FFFF" which indicates a "busy" condition. The channel resource manager 511 updates the resource table 538 in the IP gateway 513.

Channel Tracking

In order to grant a channel change request, the channel resource manager 511 returns a Channel Resource Confirmation message 536 to the out-of-band controller 525, which transmits the Channel Resource Confirmation message to the settop 524 in the out-of-band region of the CATV spectrum. FIG. 8 illustrates the format of the Channel Resource Confirmation message. The settop box responds to the Channel Resource Confirmation message 535 by selecting the new PID as the new source of IP packets over MPEG data packets. If the new PID is FFFF, then the requested channel was "busy". In response to a busy signal, the settop box 524 uses the out-of-band channel to receive IP data packets using DVB Multi-Protocol Encapsulation.

The two types of Internet connection are illustrated in FIG. 5 (lower half of drawing). In the upstream direction, HTTP data packets 540 are forwarded to the out-of-band controller 525, and further transmitted 541 to the proxy server 504 which is coupled 552 to the Internet 502. In the downstream direction 553, HTTP data packets 551 are forwarded from the proxy server 504 to the IP gateway 513. In order to forward the HTTP data packets to the settop box 524, the IP gateway 513 looks up the appropriate connection information in the channel resource table stored in the IP gateway 513.

If the setup box 524 has a current (active) valid packet ID assigned it in the current 6 MHz video channel, the IP gateway 513 forwards the HTTP downstream message 544 to the MPEG multiplexer 516. The MPEG multiplexer 516 then formats the HTTP message as IP over MPEG 546 (in-band) to the settop box 524. If, on the other hand, no current (active) valid packet ID has been assigned to the settop box 524, (for the currently viewed 6 MHz video channel), the channel resource table may indicate that an out-of-band IP connection session is established. If so, then the IP gateway 513 forwards the HTTP downstream message 542 to the out-of-band controller 524. Now, the Internet protocol packets are formatted as out-of-band messages 550 to the settop 524.

Figure 6A:
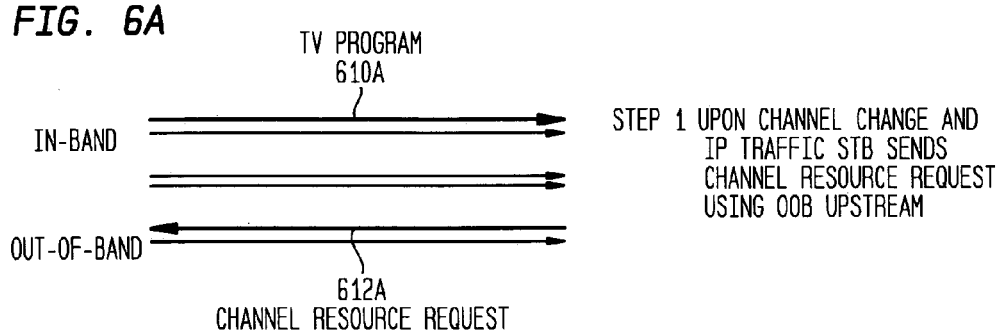
FIG. 6A illustrates the signal flow for making Channel Resource Request upon channel change in accordance with present invention.
Figure 6B:
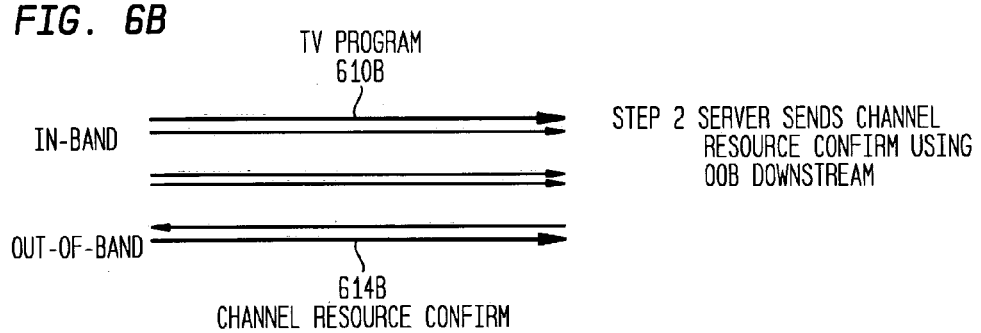
FIG. 6B illustrates the signal flow for receiving the Channel Resource Confirmation message upon channel change in accordance with present invention.

An overview of sequence of operations is illustrated in FIGS. 6A through 6D. In FIG. 6A, the TV program 610A is transmitted in-band to the viewer. Upon channel change, a Channel Resource Request 612A is sent from the settop box using the out-of-band upstream spectrum. In FIG. 6B, the headend responds by sending a Channel Resource Confirm 614B to the settop box.

Figure 6C:
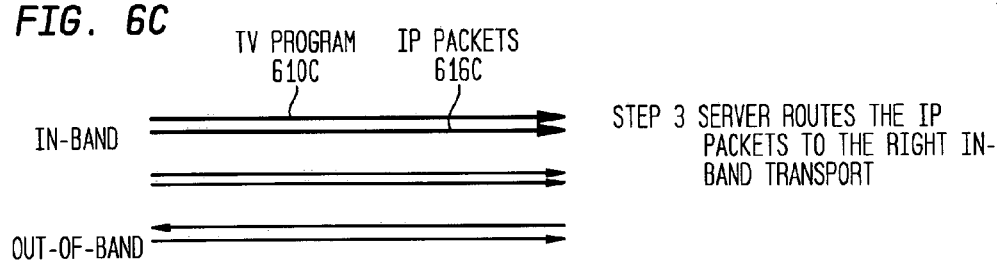
FIG. 6C illustrates the signal flow for receiving a digital TV program with Internet access by IP packets carried over MPEG multiplexed video.
Figure 6D:
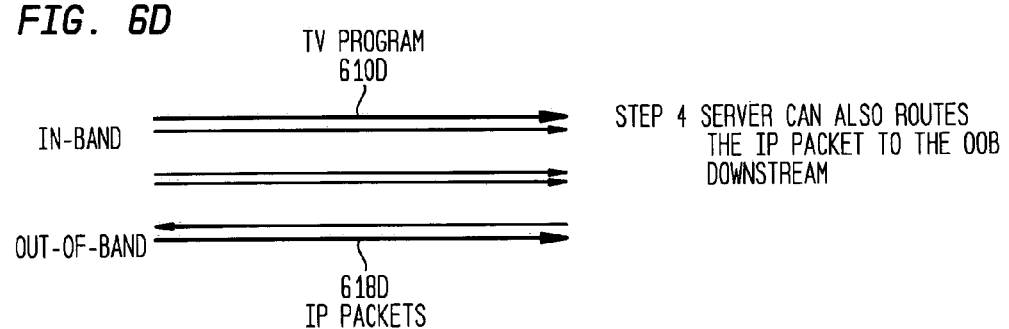
FIG. 6D illustrates the signal flow for receiving a digital TV program with Internet access by IP packets carried in the out-of-band downstream signal path.

If the requested channel change could accommodate an additional user of IP over MPEG data packets, then both the TV program 610C and the IP packets 616C are both transmitted in-band as shown in FIG. 6C. If, on the other hand the requested channel change was busy and could not accommodate additional IP over campaign data packets, then the IP data packets 618D are transmitted out-of-band as shown in FIG. 6D.

For each channel change, the communication protocol process in FIGS. 6A through 6D is repeated. Upstream communication channels from the settop to the headend are always out-of-band. Downstream communication channels from the headend to the settop are selected by the headend to be either out-of-band or in-band. The headend selects a downstream communication channel for the settop (responsive to a request from the settop) based on the video channel being watched by the viewer and the communication traffic load on the CATV system.

TABLE 1

CHANNEL RESOURCE REQUEST MESSAGES

Channel Resource Request Message ( ) {
  commonDescriptorHeader ( ) {

| | | |
|---|---|---|
| resourceRequestID | 2 | STB assigned ID for message |
| resourceDescriptorType | "0x0004" | PhysicalChannelResourceDescriptor |
| resourceNum | 2 | NOT USED |
| associationTag | 2 | NOT USED |
| resourceFlags | "0x42" | Use only current channel "non-Negotiable" |

TABLE 1-continued

CHANNEL RESOURCE REQUEST MESSAGES

```
                           (or "0x46")    (Can use any channel "Negotiable")
        resourceStatus     1              NOT USED
        resourceLength     "0x0006"       Total length of the descriptor
        resourceDataFieldCount "0x0001"   Only one resource descriptor
    }
    PhysicalChannelResourceDescriptor ( ) {
        channelID          4              programID(2) + transport_streamID(2)
        direction          "0x0000"       (downstream)
    }
}
```

TABLE 2

CHANNEL RESOURCE CONFIRM MESSAGES

```
Channel Resource Confirm Message ( ) {
commonDescriptorHeader ( ) {
        resourceRequestID       2              STB assigned ID for message
        resourceDescriptorType  "0x0003"       MPEGProgramResourceDescriptor
        resourceNum             2              Assigned by server (0x8000–0x8fff)
        associationTag          2              NOT USED
        resourceFlags           "0x42"         Use only current channel "non-Negotiable"
                                (or "0x46")    (Can use any channel "Negotiable")
        resourceStatus          1              See status table
        resourceLength          "0x0010"       Total length of the descriptor
        resourceDataFieldCount  "0x0001"       Only one resource descriptor
    }
    MPEGProgramResourceDescriptor ( ) {
        mpegProgramNum          2              ProgramID
        mpegPmtPid              2              TransportStreamID
        mpegCaPID               2              NOT USED
        elementaryStreamCount   "0x0001"       Only one data PID per TS
        mpegPID                 2              PID for the data "FFFF" for Out-of-Band
        stream_type             "0x0D"         DVB Multi-Protocol Encapsulation
        reserved                "0x00"
        associationTag          2              NOT USED
        mpegPCR                 "0xffff"       No PCR
    }
}
```

What is claimed is:

1. In a digital video television communication system having a headend coupled to a two-way communication medium and at least one digital video settop box coupled to said two-way communication medium, said headend transmitting on a plurality of communication channels including first and second in-band video channels and an out-of-band region having at least one out-of-band communication channel, said first in-band video channel having a first plurality of multiplexed digital video channels, said second in-band video channel having a second plurality of multiplexed digital video channels, one of said multiplexed digital video channels in said first in-band video channel associated with an IP connection, a method of operation comprising:

sending a channel resource request from said settop box to said headend, said channel resource request representing a channel change at said settop box from said one of the multiplexed digital video channels in said first in-band video channel to one of the multiplexed digital video channels in said second in-band video channel, said channel resource request for changing the IP connection association from said one of the multiplexed digital video channels in said first in-band video channel to said one of the multiplexed digital video channels in said second in-band video channel;

determining whether said second in-band video channel has available capacity for transporting IP data of the IP connection in said second in-band video channel using IP over MPEG data packets, wherein available capacity is determined based on a number of other IP connections supported by said second in-band video channel;

selecting a communication channel at said headend by selecting one of:

an available communication channel in said second in-band video channel if said second in-band video channel has the available capacity for transporting the IP data of the IP connection in said second in-band video channel; and one of the at least one out-of-band communication channel if said second in-band video channel does not have the available capacity for transporting the IP data of the IP connection in said second in-band video channel;

sending a channel resource confirmation message from said headend to said settop box, said channel resource confirmation message identifying said selected communication channel; and selecting said selected communication channel at said settop box for receiving the IP data of the IP connection from said headend.

2. A method in accordance with claim 1, wherein said selected communication channel is identified in said channel resource confirmation message by a packet ID (PID).

3. A method in accordance with claim 2, wherein said PID comprises a default value if the one of the at least one out-of-band communication channel is selected.

4. In a headend for a digital video television communication system including said headend coupled to a two-way communication medium and at least one digital video settop box coupled to said two-way communication medium, said headend transmitting on a plurality of communication channels including first and second in-band video channels and an out-of-band region having at least one out-of-band communication channel, said first in-band video channel having a first plurality of multiplexed digital video channels, said second in-band video channel having a second plurality of multiplexed digital video channels, one of said multiplexed digital video channels in said first in-band video channel associated with an IP connection, a method of operation comprising:

receiving a channel resource request from said settop box at said headend, said channel resource request representing a channel change at said settop box from said one of the multiplexed digital video channels in said first in-band video channel to one of the multiplexed digital video channels in said second in-band video channel, said channel resource request for changing the IP connection association from said one of the multiplexed digital video channels in said first in-band video channel to said one of the multiplexed digital video channels in said second in-band video channel;

determining whether said second in-band video channel has available capacity for transporting IP data of the IP connection in said second in-band video channel using IP over MPEG data packets, wherein available capacity is determined based on a number of other IP connections supported by said second in-band video channel;

selecting a communication channel at said headend by selecting one of:
  an available communication channel in said second in-band video channel if said second in-band video channel has the available capacity for transporting the IP data of the IP connection in said second in-band video channel; and
  one of the at least one out-of-band communication channel if said second in-band video channel does not have the available capacity for transporting the IP data of the IP connection in said second in-band video channel; and sending a channel resource confirmation message from said headend towards said settop box, said channel resource confirmation message identifying said selected communication channel.

5. A headend method in accordance with claim 4, wherein said selected communication channel is identified in said channel resource confirmation message by a packet ID (PID).

6. A headend method in accordance with claim 5, wherein said PID comprises a default value if the one of the at least one out-of-band communication channel is selected.

7. In a settop box for a digital video television communication system having a headend coupled to a two-way communication medium and said settop box coupled to said two-way communication medium, said headend transmitting on a plurality of communication channels including first and second in-band video channels and an out-of-band region having at least one out-of-band communication channel, said first in-band video channel having a first plurality of multiplexed digital video channels, said second in-band video channel having a second plurality of multiplexed digital video channels, one of said multiplexed digital video channels in said first in-band video channel associated with an IP connection, a method of operation comprising:

sending a channel resource request from said settop box towards said headend, said channel resource request representing a channel change at said settop box from said one of the multiplexed digital video channels in said first in-band video channel to one of the multiplexed digital video channels in said second in-band video channel, said channel resource request for changing the IP connection association from said one of the multiplexed digital video channels in said first in-band video channel to said one of the multiplexed digital video channels in said second in-band video channel, wherein said channel resource request is adapted for identifying a selected communication channel at said headend by selecting one of:
  an available communication channel in the second in-band video channel if the second in-band video channel has available capacity for transporting IP data of the IP connection; and
  one of the at least one out-of-band communication channel if the second in-band video channel does not have available capacity for transporting IP data of the IP connection;
  wherein available capacity is determined based on a number of other IP connections supported by said second in-band video channel;

receiving a channel resource confirmation message identifying said selected communication channel; and selecting said selected communication channel at said settop box for adapting the settop box to receive the IP data of the IP connection from said headend as IP over MPEG data packets.

8. A settop method in accordance with claim 7, wherein said selected communication channel is identified in said channel resource confirmation message by a packet ID (PID).

9. A settop method in accordance with claim 8, wherein said PID comprises a default value if the one of the at least one out-of-band communication channel is selected.

10. A digital video television communication system, comprising:

a two-way communication medium having a plurality of communication channels including an out-of-band region having at least one out-of-band communication channel and a plurality of in-band video channels, each of the in-band video channels adapted for transporting IP data of an IP connection using a plurality of IP over MPEG data packets, each of said IP over MPEG data packets being identified by a packet ID;

a digital video settop box coupled to said two-way communication medium, said digital video settop box comprising:
  a digital video settop transmitter for transmitting a channel resource request on the two-way communication medium in response to a video channel change at said digital video settop box, said channel resource request representing a channel change from a multiplexed digital video channel in a first one of the plurality of in-band video channels to a multiplexed digital video channel in a second one of the plurality of in-band video channels, said channel resource request for changing an association of the IP connection from the first in-band video channel to the second in-band video channel; and a digital video settop receiver for receiving a channel resource confirmation message identifying a selected communication channel, said selected communication channel comprising one of:
  an available communication channel in the second in-band video channel if said second in-band video channel has available capacity for transporting the IP data of the IP connection; and
  one of the at least one out-of-band communication channel if said second in-band video channel does not have the available capacity for transporting the IP data of the IP connection;
  wherein available capacity is determined based on a number of other IP connections supported by said second in-band video channel; and
a headend coupled to said two-way communication medium, said headend comprising:
  a headend receiver for receiving said channel resource request; and
  a headend transmitter for transmitting said channel resource confirmation message to said digital video settop box on said two-way communication medium.

11. In a digital video television communication system including a two-way communication medium having a plurality of communication channels including a plurality of in-band video channels, each of the in-band video channels adapted for transporting IP data of an IP connection using a plurality of IP over MPEG data packets, each of said IP over MPEG data packets being identified by a packet ID, and a headend coupled to said two-way communication medium, said headend adapted for generating a channel resource confirmation message on said two-way communication medium responsive to a channel resource request, an apparatus comprising:
  a digital video settop box, coupled to said two-way communication medium, said digital video settop box comprising:
    a digital video settop transmitter coupled to the two-way communication medium for transmitting the channel resource request on the two-way communication medium in response to a video channel change at said digital video settop box, said channel resource request representing a channel change from a multiplexed digital video channel in a first in-band video channel of the plurality of in-band video channels to a multiplexed digital video channel in a second in-band video channel of the plurality of in-band video channels, said channel resource request for changing an association of the first in-band video channel with the IP connection to an association of the second in-band video channel with the IP connection; and
  a digital video settop receiver coupled to said two-way communication system for receiving a channel resource confirmation message identifying a selected communication channel, said selected communication channel comprising one of:
    an available communication channel in the second in-band video channel if said second in-band video channel has available capacity for transporting the IP data of the IP connection; and
    an out-of-band communication channel in an out-of-band region of the digital video television communication system if said second in-band video channel does not have the available capacity for transporting the IP data of the IP connection;
    wherein available capacity is determined based on a number of other IP connections supported by said second in-band video channel.

12. In a digital video television communication system including a settop box coupled to a two-way communication medium having a plurality of communication channels including a plurality of in-band video channels, each of the in-band video channels adapted for transporting IP data of an IP connection using a plurality of IP over MPEG data packets, each of said IP over MPEG data packets being identified by a packet ID, an apparatus comprising:
  a headend coupled to said two-way communication medium, said headend comprising:
    a headend receiver for receiving a channel resource request from said digital video settop box indicating a video channel change at said digital video settop box, said channel resource request representing a channel change from a multiplexed digital video channel in a first in-band video channel of the plurality of in-band video channels to a multiplexed digital video channel in a second in-band video channel of the plurality of in-band video channels, said channel resource request for changing an association of the first in-band video channel with the IP connection to an association of the second in-band video channel with the IP connection;
    a headend selector module coupled to said headend receiver for processing said channel resource request, the headend selector module operable for selecting a communication channel by selecting one of:
      an available data communication channel from said second in-band video channel identified in the channel resource request if said second in-band video channel has available capacity for transporting the IP data; and
      an out-of-band communication channel in an out-of-band region of said digital video television communication system if said second in-band video channel does not have available capacity for transporting the IP data;
      wherein available capacity is determined based on a number of other IP connections supported by said second in-band video channel: and
    a headend transmitter coupled to said headend selector module for transmitting a channel resource confirmation message in response to the channel resource request, wherein the channel resource confirmation message identifies the selected communication channel, the selected communication channel adapted for transporting the IP data from the headend towards the digital video settop box.

13. A headend method in accordance with claim 12, wherein said selected communication channel is identified in said channel resource confirmation message by said packet ID.

14. A headend method in accordance with claim 13, wherein said packet ID comprises a default value if the out-of-band communication channel is selected.

* * * * *